(12) United States Patent
Suga et al.

(10) Patent No.: US 7,358,636 B2
(45) Date of Patent: Apr. 15, 2008

(54) ELECTRIC MOTOR HAVING RESILIENT MEMBER AND APPARATUS FOR MANUFACTURING THE SAME

(75) Inventors: Makoto Suga, Nagoya (JP); Keisuke Kawano, Kariya (JP); Motoya Ito, Hekinan (JP); Kiyoshi Hirase, Handa (JP)

(73) Assignee: Denso Corporation (JP)

( * ) Notice: Subject to any disclaimer, the term of this patent is extended or adjusted under 35 U.S.C. 154(b) by 215 days.

(21) Appl. No.: 10/960,932

(22) Filed: Oct. 12, 2004

(65) Prior Publication Data

US 2005/0116568 A1  Jun. 2, 2005

(30) Foreign Application Priority Data

Nov. 27, 2003 (JP) .............................. 2003-397085
Apr. 21, 2004 (JP) .............................. 2004-125169

(51) Int. Cl.
*H02K 21/26* (2006.01)
(52) U.S. Cl. ................................. 310/154.14
(58) Field of Classification Search ........... 310/154.03, 310/154.08, 154.13–154.17, 91
See application file for complete search history.

(56) References Cited

U.S. PATENT DOCUMENTS

| 2,513,227 A | * | 6/1950 | Wylie .................... 310/154.25 |
| 4,668,887 A | | 5/1987 | D'Argouges et al. |
| 5,391,063 A | * | 2/1995 | Hantle et al. ............ 417/423.7 |
| 6,359,363 B1 | * | 3/2002 | Foerstera et al. ........... 310/239 |

FOREIGN PATENT DOCUMENTS

| FR | 2734958 | 12/1996 |
| JP | 52-95008 | 1/1976 |
| JP | 55-012829 | 1/1980 |
| JP | B2-8-9995 | 1/1996 |

OTHER PUBLICATIONS

Chinese Office Action dated Jun. 12, 2006 (with translation).
Japanese Office Action dated Apr. 25, 2007 issued in corresponding JP Application No. 2004-125169 (with English translation).

* cited by examiner

*Primary Examiner*—Dang Le
*Assistant Examiner*—Nguyen N. Hanh
(74) *Attorney, Agent, or Firm*—Nixon & Vanderhye (57) ABSTRACT

An electric motor includes a housing that receives multiple magnets that are circumferentially arranged in the housing. A resilient member has two inserted portions that are respectively inserted into gaps formed among the magnets. For example, four inserted portions of the two resilient members are respectively inserted into four gaps formed among four magnets, so that the inserted portions are resiliently deformed in the gaps. The inserted portions apply force to the magnets such that the magnets are circumferentially spaced from each other. Thus, the four magnets are urged onto an inner wall of the housing by the two resilient members. As a result, movement of the magnets is restricted in both of the circumferential direction and the axial direction of the housing. Therefore, the magnets can be maintained in the housing using a simple structure without increasing the number of components.

13 Claims, 10 Drawing Sheets

ELECTRIC MOTOR HAVING RESILIENT MEMBER AND APPARATUS FOR MANUFACTURING THE SAME

CROSS REFERENCE TO RELATED APPLICATIONS

This application is based on and incorporates herein by reference Japanese Patent Applications No. 2003-397085 filed on Nov. 27, 2003 and No. 2004-125169 filed on Apr. 21, 2004.

FIELD OF THE INVENTION

The present invention relates to an electric motor having a resilient member and an apparatus for manufacturing the motor.

BACKGROUND OF THE INVENTION

Conventionally, an electric motor disclosed in JP-B2-H8-9995 has a housing that receives multiple magnets circumferentially arranged along the inner wall of the housing. In this structure, springs or nonconductive stoppers are inserted into gaps formed between the magnets, so that the magnets are circumferentially apart from each other.

However, in this structure, multiple restricting members, such as springs and stoppers disclosed in JP-B2-H8-9995 are needed to circumferentially space the magnets from each other. Accordingly, the number of components may be increased, and the structure may become complicated.

SUMMARY OF THE INVENTION

In view of the foregoing problems, it is an object of the present invention to produce an electric motor, in which magnets are arranged in a housing with a simple structure without increasing components. It is another object of the present invention to produce an apparatus for manufacturing the electric motor, in which a resilient member is steadily press-inserted into a gap formed between magnets.

According to the present invention, an electric motor includes a substantially cylindrical housing, at least two magnets and a resilient member. The magnets that are arranged along an inner wall of the housing in the circumferential direction of the housing. The magnets, which are circumferentially adjacent to each other, define at least two gaps therebetween. The resilient member is an integrated member inserted into at least two of the gaps to bias the magnets, which are circumferentially adjacent to each other, in a direction in which the magnets are circumferentially spaced from each other.

Alternatively, a resilient member is an integrated member maintaining at least two magnets within a cylindrical housing, such that the magnets, which are arranged adjacent to each other, define at least two gaps therebetween in the circumferential direction of the housing along an inner wall of the housing. The resilient member includes at least two inserted portions that extend in a substantially axial direction of the magnets. The inserted portions are at least partially respectively inserted into the gaps defined between the magnets, which are adjacent to each other in the circumferential direction of the housing. Thus, the inserted portions respectively apply resilient force to the adjacent magnets in the circumferential direction of the housing, in which the magnets are spaced from each other.

Alternatively, a magnet fitting structure, which is received in a cylindrical housing of an electric motor, includes at least two magnets and a resilient member. The magnets are arranged along an inner wall of the cylindrical housing, such that the magnets, which are adjacent to each other, circumferentially define at least two gaps therebetween. The resilient member is an integrated member that is inserted into at least two of the gaps, such that the resilient member biases the adjacent magnets to be circumferentially spaced from each other.

Alternatively, an electric motor manufacturing apparatus inserts a resilient member formed of a resilient wire into at least two gaps defined by at least two magnets that are cylindrically arranged to be adjacent to each other. The resilient member applies force to the adjacent magnets in the circumferential direction, in which the adjacent magnets are spaced from each other.

The electric motor manufacturing apparatus includes a magnet support, a guide member and a press-inserting member. The magnet support defines space in which the magnets that are circumferentially supported to be a substantially cylindrical structure, such that inserted portions of the resilient member are able to be respectively inserted into the gaps that are defined by the magnets that are circumferentially adjacent to each other. The guide member has a cylindrical shape such that the guide member covers the axially end portion of the resilient member, which is located on the axially opposite side as the inserted portions, from the outside in the radial direction of the magnet support. The guide member restricts the resilient member, which is press-inserted into the gaps, from being radially outwardly inclined. The press-inserting member is arranged in an inner circumferential periphery of the guide member, such that the press-inserting member is able to axially move with respect to the guide member. The press-inserting member is able to press-insert the resilient member into the gaps axially toward the magnet support.

Alternatively, an electric motor includes at least two substantially arc-shaped magnets that are circumferentially arranged to construct a substantially cylindrical structure. The magnets, which are circumferentially adjacent to each other in the substantially cylindrical structure, define at least two gaps therebetween. The resilient member applies force against the circumferentially adjacent magnets, such that the adjacent magnets are circumferentially spaced from each other.

A manufacturing method of the electric motor includes following process. The magnets are supported such that the magnets construct the substantially cylindrical structure. The resilient member is inserted between circumferentially end portions of the adjacent magnets that are circumferentially adjacent to each other. An axially end portion of the resilient member, which is located on the axially opposite side as the inserted portion, is covered from the outside in the radial direction of the cylindrical structure constructed of the magnets. The resilient member is press-inserted between the circumferentially end portions of the adjacent magnets while the resilient member is restricted from being radially outwardly inclined by covering the axially end portion of the resilient member from the axially opposite side as the inserted portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
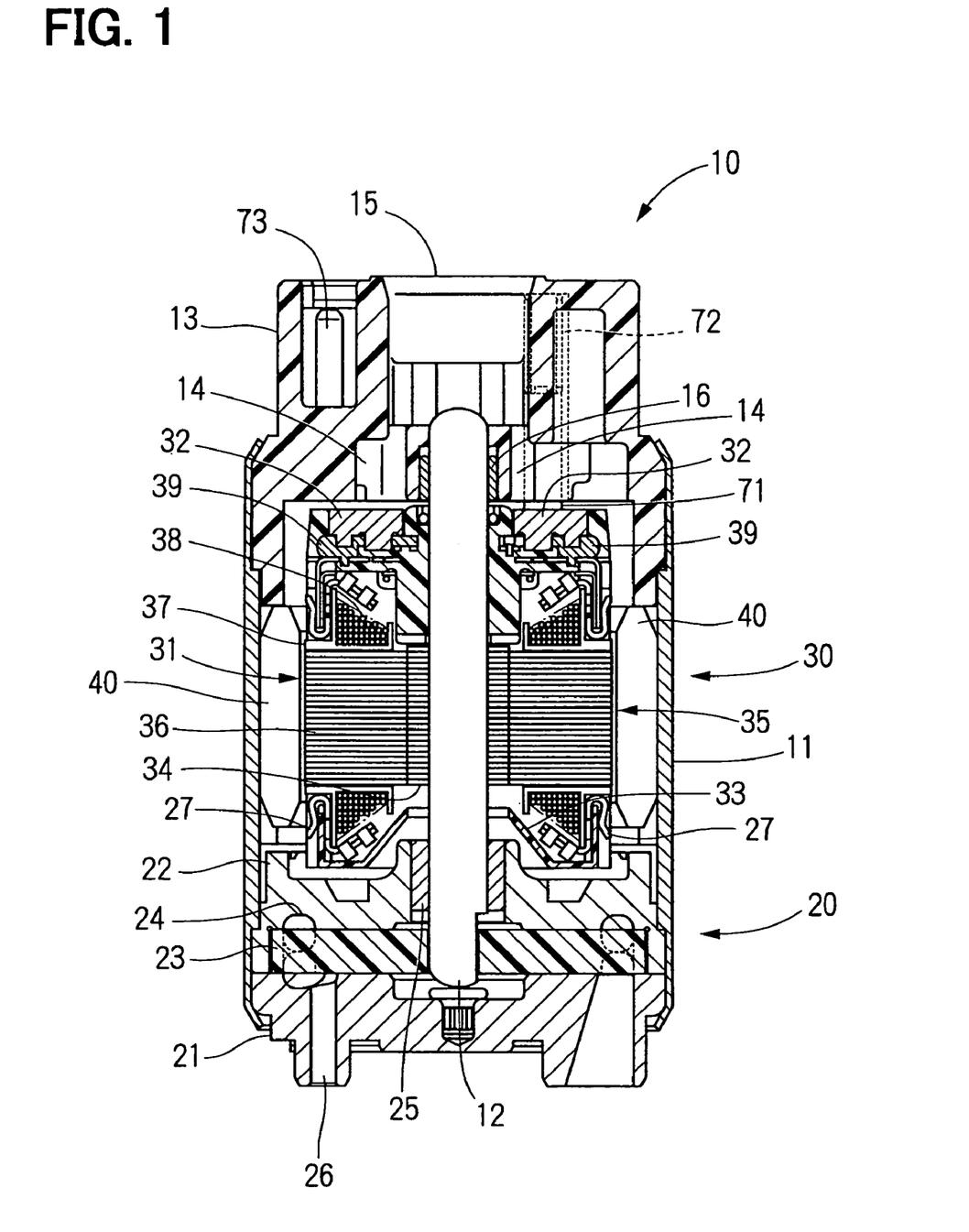
FIG. 1 is cross-sectional side view showing a fuel pump according to a first embodiment of the present invention.

As shown in FIG. 1, a fuel pump 10 includes a pump portion 20 and a motor portion 30. The fuel pump 10 is an in-tank type pump received in a fuel tank (not shown) of a vehicle or the like. The pump portion 20 pressurizes fuel drawn from the fuel tank. The motor portion 30 drives the pump portion 20 that includes a cover 21, a casing 22 and a disc-shaped impeller 23. The disc-shaped impeller 23 is a rotating member. The motor portion 30 has a D.C. motor including magnets 40 serving as a stator, an armature 31 serving as a moving element and a commutator 32.

The fuel pump 10 has a housing 11 that is crimped in axially both ends, so that the housing 11 is joined with the cover 21 and a pump cover 13 that are provided on axially both sides of the shaft 12. The casing 22 is axially inserted between the cover 21 and the housing 11. A substantially C-shaped pump passage 24 is formed between the cover 21 and the casing 22. The cover 21 and the casing 22 are case members, in which the impeller 23 is rotatably received. The casing 22 receives a bearing 25 in the inner circumferential periphery of the casing 22.

The impeller 23 has multiple vanes on the outer circumferential periphery of the impeller 23. The shaft 12 and the impeller 23 are rotated by the armature 31, so that differential pressure is generated between both axial sides of the vanes of the impeller 23. The impeller 23 rotates, so that fuel received in the fuel tank is drawn from a fuel suction port 26 formed in the cover 21 into a fuel passage 24 that is formed along the outer circumferential periphery of the impeller 23. The fuel drawn from the fuel suction port 26 is discharged from the casing 22 to a cover 33 that is provided on the axially end side of the armature 31 that is located on the axially opposite side as the commutator 32. The fuel flows to the commutator 32 after passing by the outer circumferential periphery of the armature 31. The fuel is discharged from a fuel discharge port 15 after passing through a communication passage 14 formed around the shaft 12 in the pump cover 13. The fuel discharged from the fuel discharge port 15 is supplied to an internal combustion engine (not shown).

Figure 2:
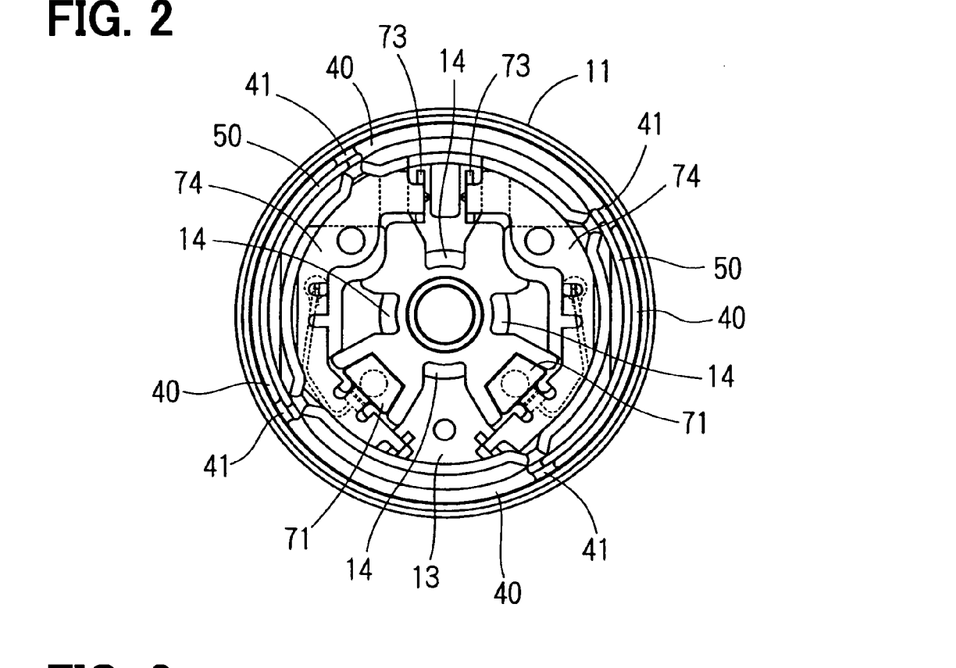
FIG. 2 is a bottom view showing an internal structure of the fuel pump according to the first embodiment.

The pump cover 13 is formed of resin. The pump cover 13 covers the motor portion 30 on the side of the commutator 32. The fuel discharge port 15 is formed in a substantially central portion of the pump cover 13 along the axial direction of the shaft 12. As shown in FIGS. 1 and 2, the pump cover 13 on the side of the commutator 32 receives components of the fuel pump 10. The components include blushes 71, a spring 72 that axially urges the brushes 71 onto the commutator 32, and plates 74 that electrically connect the brushes 71 with terminals 73, respectively. The commutator 32 is arranged on the axially opposite side as the impeller 23 with respect to the armature 31. The cover 33 covers an axially end opening that is located axially opposite as the commutator 32 with respect to the armature 31 in the housing 11. The shaft 12, which serves as a rotation axis of the armature 31, is rotatably supported by the bearing 25 received in the casing 22 on one axially end side. The shaft 12 is rotatably supported by a bearing 16 supported by the pump cover 13 on the other axially end side.

The armature 31 has a core 34 in the rotation center of the armature 31. The shaft 12 is press-inserted into the core 34. Multiple magnetic pole coils 35 are circumferentially arranged on the outer circumferential periphery of the core 34, and are connected with the core 34. Each of the magnetic pole coils 35 includes a coil core 36, a bobbin 37, and a coil 38 that is wound around the bobbin 37. In this example, six of the magnetic pole coils 35 are arranged along the outer circumferential periphery of the core 34. Each of the magnetic pole coils 35 has the same structure.

The axial ends of the coils 38 on the side of the commutator 32 are respectively electrically connected with terminals 39. The terminals 39 are radially inwardly located with respect to the outer circumferential periphery of the armature 31, so that the terminal 39 does not inhibit fuel passing by the outer circumferential periphery of the armature 31. The terminals 39 are electrically connected with the commutator 32. The coils 38 are also respectively electrically connected with terminals 27 on the side of the impeller 23 which is located on the opposite side as the a commutator 32 with respect to the armature 31.

The commutator 32 is integrally formed to be a cassette-type commutator. The commutator 32 has multiple segments that are circumferentially arranged. In this structure, the commutator 32 has six segments corresponding to the six magnetic pole coils 35. The segments of the commutator 32, which are circumferentially adjacent to each other, are electrically insulated. As the armature 31 rotates, the segments of the commutator 32 electrically contact with the blushes 71 one after another. As shown in FIGS. 1 to 4, four magnets 40 are circumferentially arranged along the inner wall 11a of the housing 11, in this structure. Each of the magnets 40 has magnetic poles on its circumferential ends, and the magnetic poles are different from each other in the magnet 40. The four magnets 40 circumferentially form four gaps between circumferentially adjacent magnets 40.

Figure 3:
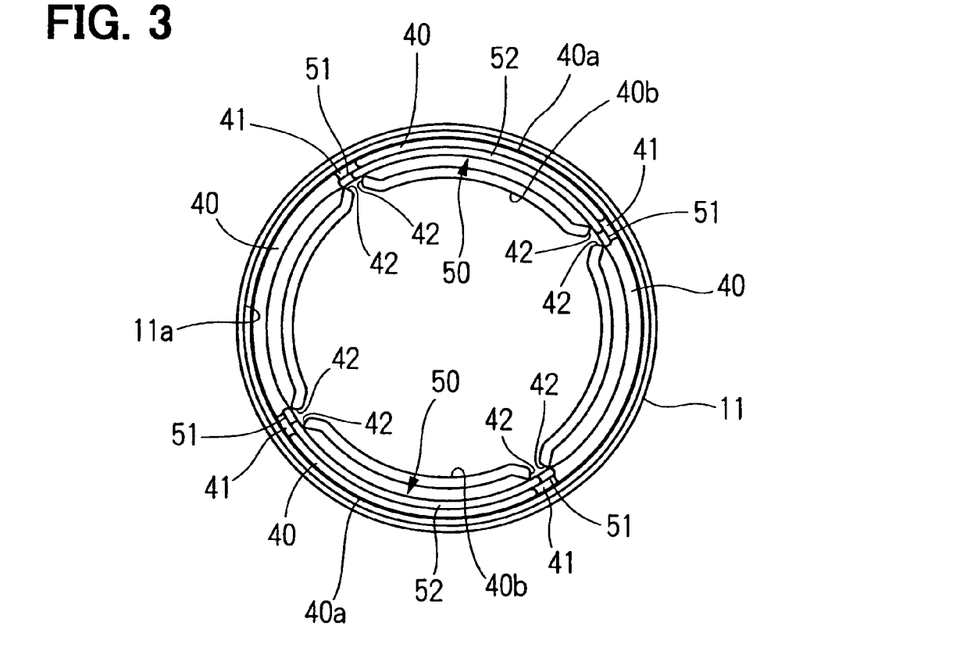
FIG. 3 is a bottom view showing a housing of the fuel pump receiving magnets and resilient members according to the first embodiment.
Figure 5:
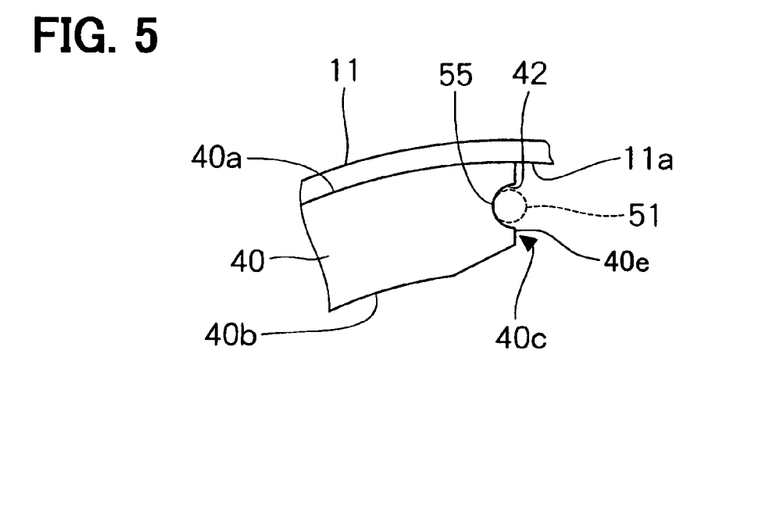
FIG. 5 is an enlarged bottom view showing a circumferentially end portion of the magnet and the resilient member according to the first embodiment.
Figure 6:
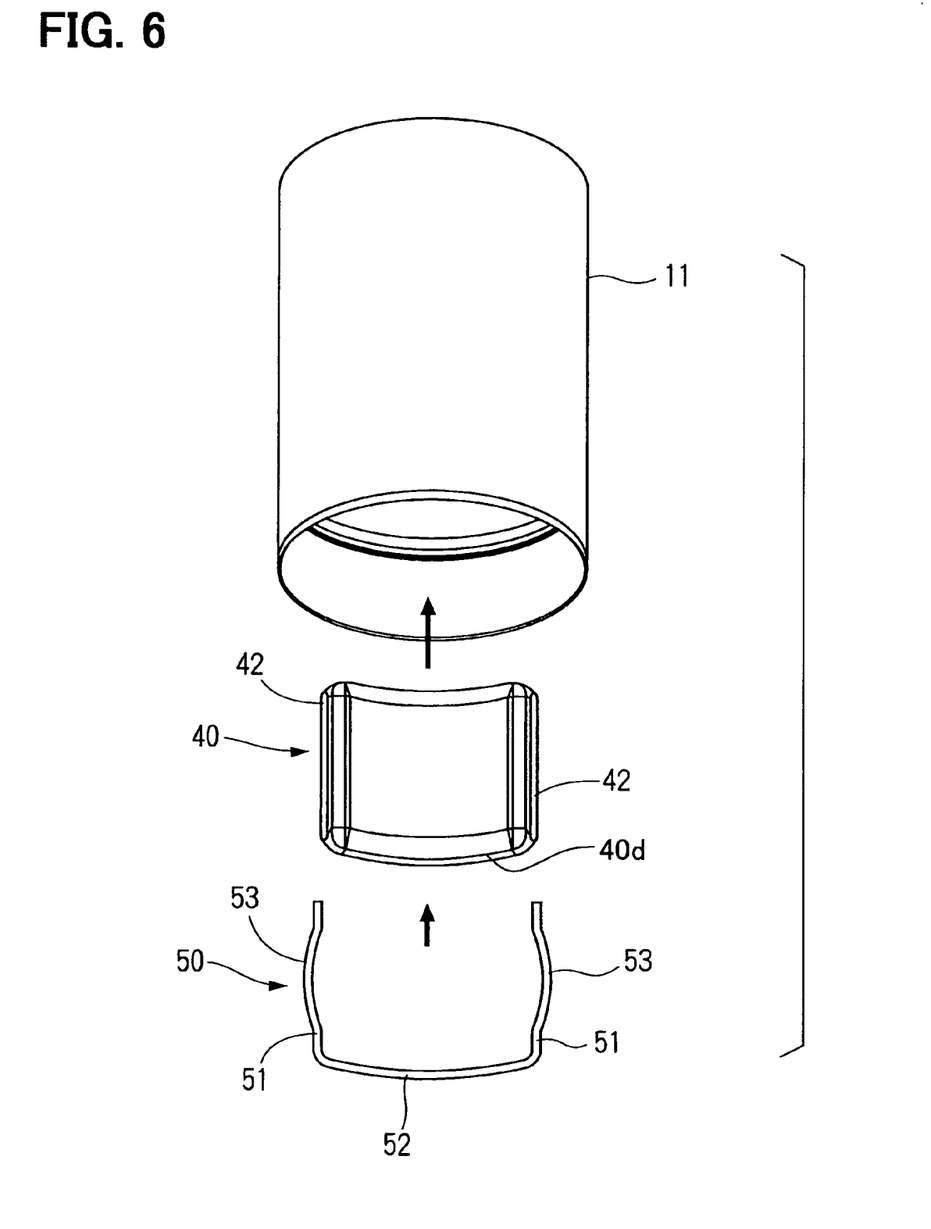
FIG. 6 is an exploded perspective view showing the housing, the magnet and the resilient member according to the first embodiment.

As shown in FIGS. 3, 5 and 6, each of the magnets 40 has grooves 42. Each groove 42 is recessed from each circumferentially end face 40e of the circumferentially end portion 40c of the magnet 40. The groove 42 of the magnet 40 is recessed toward the other circumferentially opposite side. In this embodiment, the groove 42 has an arc shaped cross section.

Figure 4:
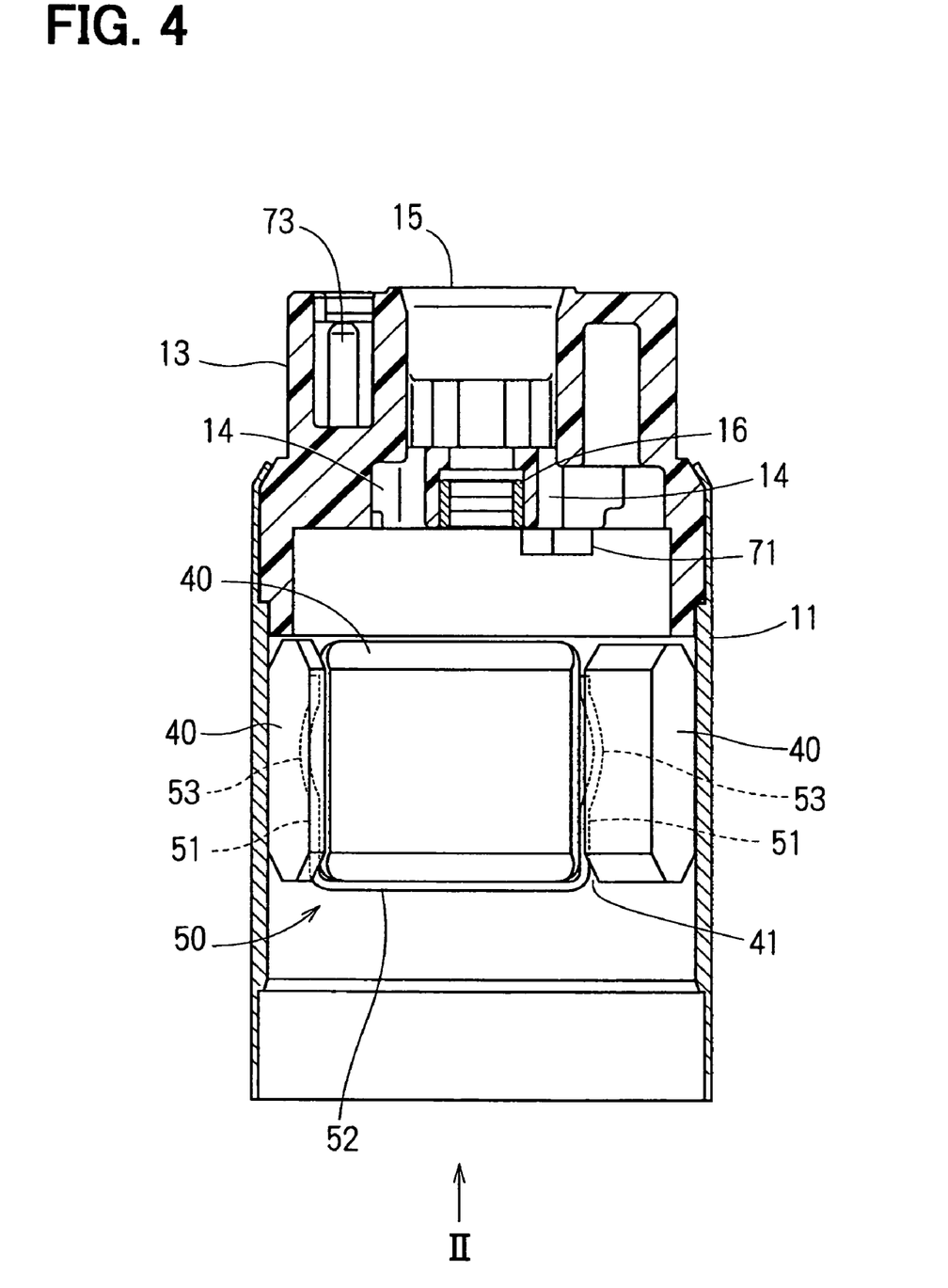
FIG. 4 is a cross-sectional side view showing the housing of the fuel pump receiving the magnets and the resilient members according to the first embodiment.
Figure 7A:
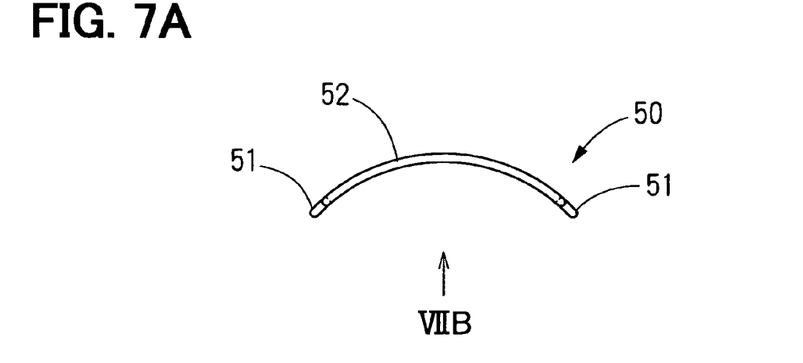
FIG. 7A is a top view showing the resilient member.
Figure 7B:
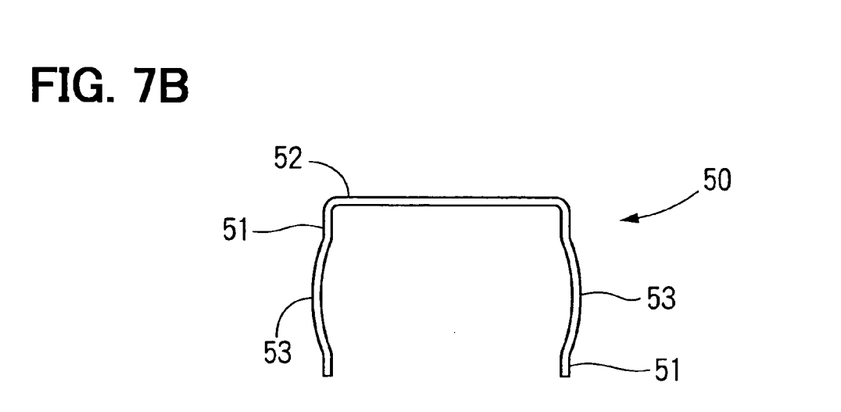
FIG. 7B is a side view showing the resilient member from the arrow VIIB in FIG. 7A according to the first embodiment.

As shown in FIGS. 2 to 4, the four magnets 40 are urged by two of the resilient members 50 in the housing 11, in this structure. Here, FIG. 2 is a bottom view showing the housing 11 receiving the magnets 40 and resilient members 50 from the arrow 11 in FIG. 4. As shown in FIGS. 6, 7A and 7B, each of the resilient members 50 has two inserted portions 51 and a connecting portion 52 that connects the two inserted portions 51. Each of the inserted portions 51 extends in the substantially axial direction of the housing 11 and the magnets 40. The resilient member 50 is formed such that a resilient wire (e.g., metallic wire) is bent to be in a substantially U-shape.

The inserted portions 51 of the resilient member 50 are respectively inserted into gaps 41 formed among the adjacent magnets 40 that are circumferentially adjacent to each other. Each of the inserted portions 51 is bent in an axially intermediate portion thereof, so that a bent portion 53 is formed in the longitudinally intermediate portion of the inserted portion 51. The resilient member 50 is resiliently deformed, so that the resilient member 50 can generate compression force in a direction, which is opposite to a direction in which the resilient member 50 is resiliently deformed. The connecting portion 52 of the resilient member 50 has a shape, such that the connecting portion 52 is located circumferentially along an axially end face 40d of the magnet 40. That is, the connecting portion 52 has a substantially arc shape circumferentially corresponding to the axially end face 40d of the magnet 40 that is formed in an arc shape circumferentially along the inner wall 11a of the housing 11. Referring back to FIG. 3, the connecting portion 52 of the resilient member 50 is located radially between a radially outer face 40a of the magnet 40 and a radially inner face 40b of the magnet 40, when the resilient member 50 is connected to the magnets 40. Therefore, the connecting portion 52 of the resilient member 50 does not radially inwardly protrude from the magnet 40. That is, the connecting portion 52 does not protrude from the radially inner face 40b of the magnet 40.

In this structure, the motor portion 30 includes four magnets 40, therefore two resilient members 50 are provided in the motor portion 30. Each of the resilient members 50 has two inserted portions 51. Therefore, the four inserted portions 51 of the two resilient members 50 are respectively inserted into the four gaps 41 formed among the four magnets 40 that are circumferentially adjacent to each other.

The inserted portions 51 of the resilient members 50 are respectively inserted into the gaps 41 formed between the adjacent magnets 40, so that resilient force is circumferentially applied between the adjacent magnets 40 due to resilient deformation of the resilient members 50. That is, each of the inserted portions 51 is inserted into each of the gaps 41 formed between the adjacent magnets 40, so that the bent portion 53 of the inserted portion 51 is deformed. The inserted portion 51 applies force to the magnets 40, which are circumferentially opposed to each other such that the magnets 40 circumferentially define the gaps 41, in a direction in which the circumferentially opposed magnets 40 are apart from each other. Thus, the two resilient members 50 apply force against the four magnets 40 in a direction, in which the force increases the diameter of a substantially cylindrical structure constructed with the four circumferentially arranged magnets 40. As a result, the four magnets 40 are radially pressed onto the inner wall 11a of the housing 11, and are maintained in the housing 11.

Each of the inserted portions 51 of the resilient member 50 intrudes into the grooves 42 formed in the magnet 40, when the inserted portion 51 is inserted into the gap 41. As shown in FIG. 5, the arc shaped groove 42 has the inner diameter that is larger than the outer diameter of the inserted portion 51 of the resilient member 50. Therefore, the inserted portion 51 is at least partially received in the groove 42 formed in the magnet 40.

The inserted portion 51 circumferentially contacts with the groove 42 at a contact portion 55, which is circumferentially internally located in the magnet 40 with respect to the circumferentially 40e end face of the circumferentially end portion 40c of the magnet 40 when the inserted portion 51 is at least partially received in the grooves 42. That is, the contact portion 55 is located on the side of the other circumferentially end face of the magnet 40 that is located on the opposite side of the groove 42 in the circumferential direction of the housing 11. Thus, movement of the resilient member 50 in the radial direction of the housing 11 is restricted by the circumferentially end portion 40c that has the groove 42.

Next, a manufacturing process, in which the resilient members 50 are press-inserted into the gaps 41 formed between the adjacent magnets 40 using a motor manufacturing apparatus 60, is described.

Figure 8:
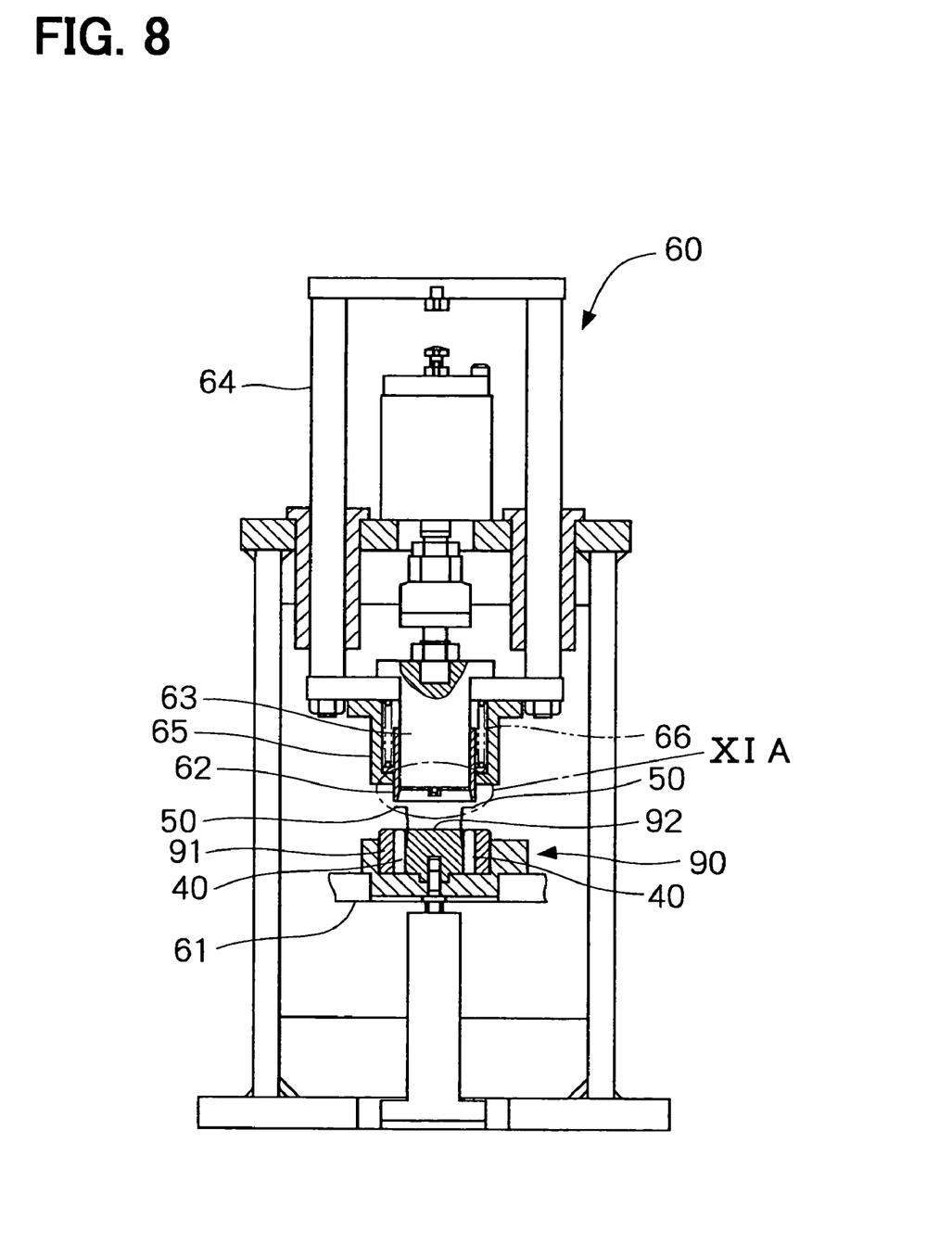
FIG. 8 is a partially cross-sectional side view showing a motor manufacturing apparatus according to the first embodiment.

As shown in FIG. 8, the motor manufacturing apparatus 60 has a main body 61 including a magnet support 90, a guide member 62 and a press-inserting member 63. The magnet support 90 is provided axially on the side of the guide member 62 with respect to the main body 61.

Figure 9:
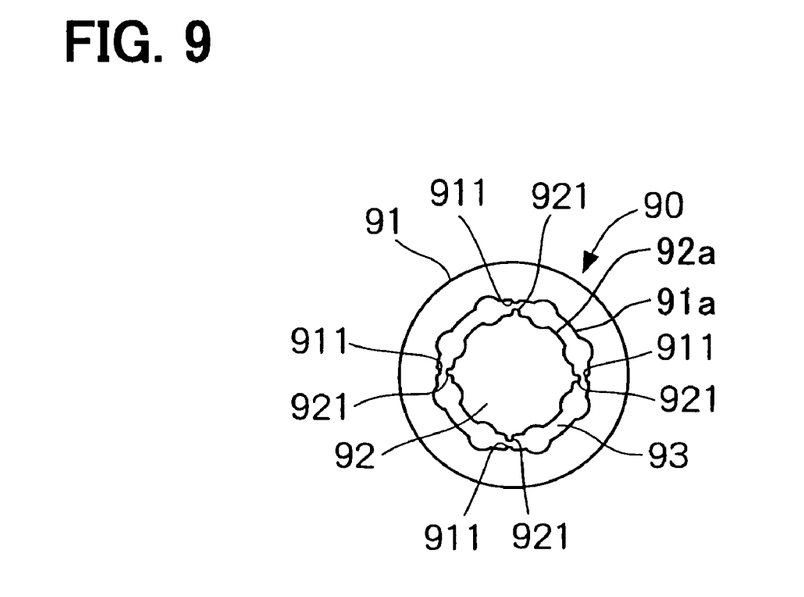
FIG. 9 is a top view showing a magnet support for the motor manufacturing apparatus according to the first embodiment.

As shown in FIG. 9, the magnet support 90 includes an outer member 91 and an inner member 92 that form a substantially cylindrical receiving space 93 therebetween. Specifically, the receiving space 93 is formed between an inner circumferential periphery 91a of the outer member 91 and an outer circumferential periphery 92a of the inner member 92 to circumferentially receive the magnet 40.

Figure 10:
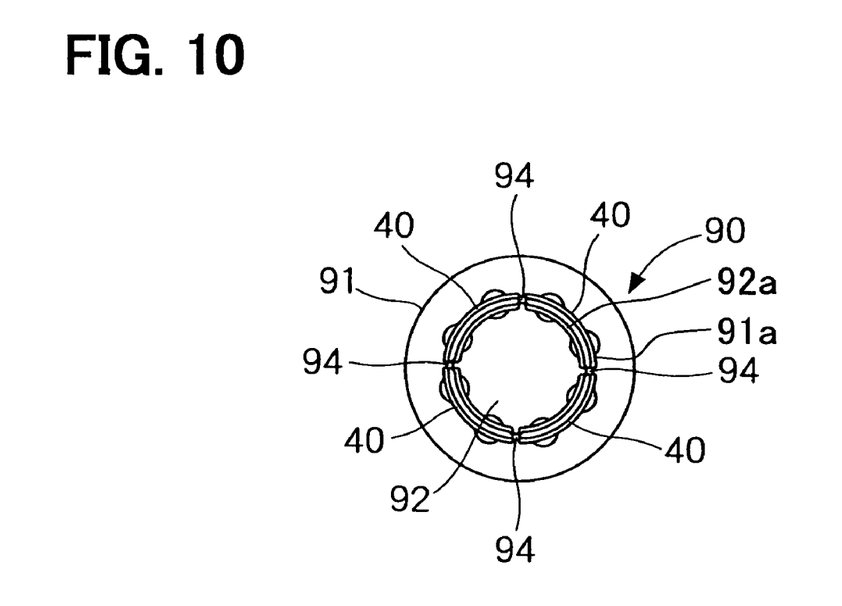
FIG. 10 is a top view showing the magnet support receiving the magnets according to the first embodiment.

As shown in FIG. 10, the four magnets 40 are circumferentially arranged at regular intervals in the receiving space 93, such that the four arc shaped magnets 40 construct a cylindrical structure. In this structure, four gaps 94 are formed among the circumferentially end portions 40c of the four magnets 40 that are adjacent to each other. The four inserted portions 51 of the two resilient members 50 are inserted into the four gaps 94. Four protrusions 911 (FIG. 9) radially protrude from the inner circumferential periphery 91a of the outer member 91 at circumferential positions corresponding to the gaps 94, and four protrusions 921 radially protrude from the outer circumferential periphery 92a of the inner member 92 in circumferential positions corresponding to the gaps 94. Therefore, circumferential movement of the four magnets 40 is restricted by the four protrusions 911 of the outer member 91 and the four protrusions 921 of the inner member 92, when the four magnets are installed in the receiving space 93.

Figure 11A:
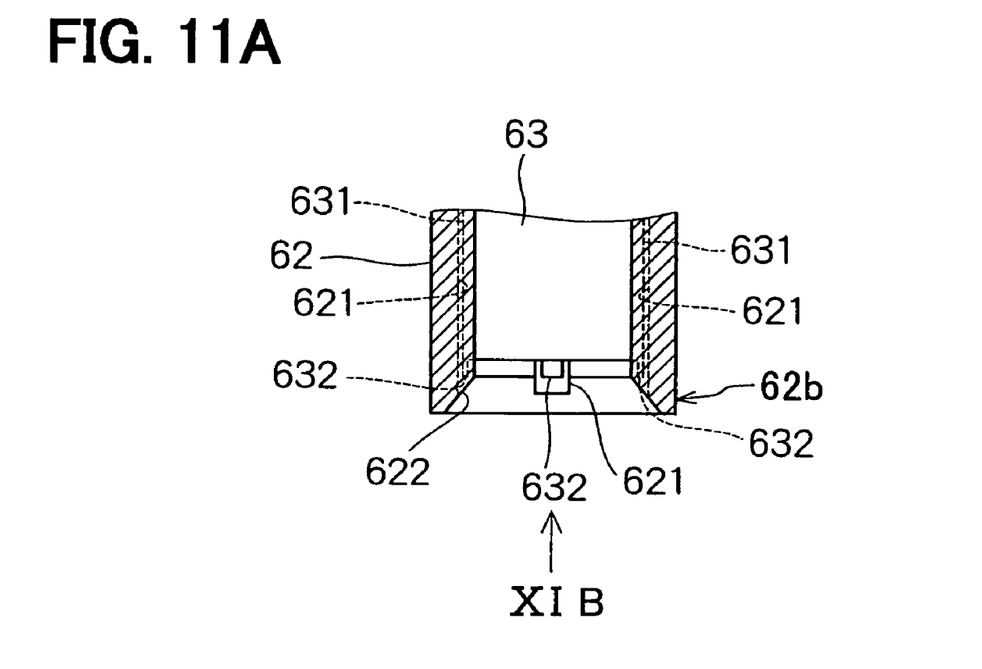
FIG. 11A is a partially cross-sectional side view showing a guide member and a press-inserting member of the motor manufacturing apparatus.
Figure 11B:
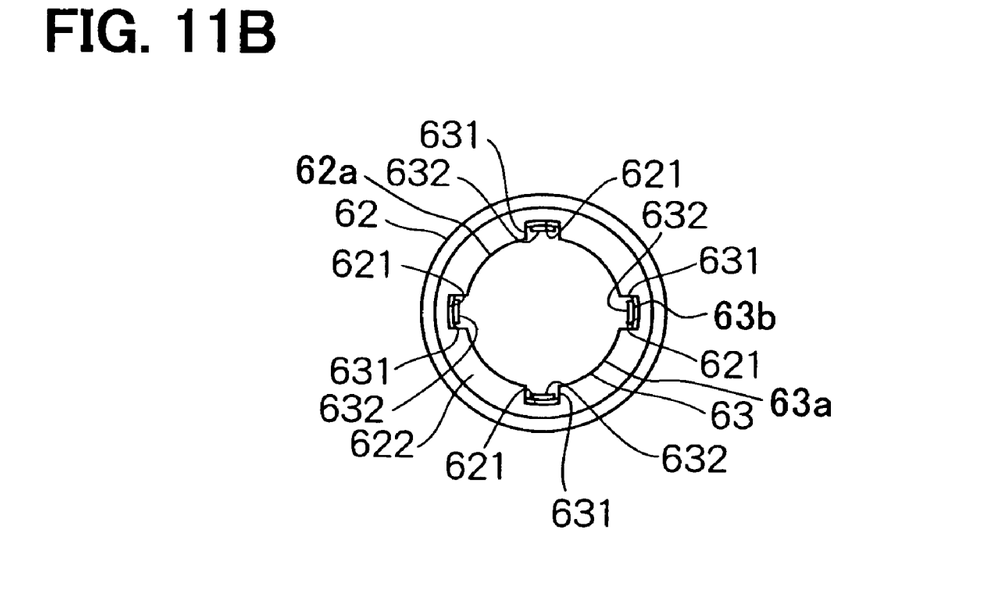
FIG. 11B is a bottom view showing the guide member and the press-inserting member from the arrow XIB in FIG. 11A according to the first embodiment.

As shown in FIGS. 11A and 11B, the guide member 62 and the press-inserting member 63 are coaxially arranged. Here, FIG. 11A is an enlarged side view showing the portion XIA in FIG. 8. The guide member 62, which receives the press-inserting member 63, and the magnet support 90 are coaxially arranged. The guide member 62 has a substantially cylindrical shape covering radially outer side of the press-inserting member 63. Thus, the guide member 62 and the press-inserting member 63 can be axially displaced with respect to each other. The guide member 62 has four grooves 621 that are radially outwardly recessed from an inner circumferential periphery 62a of the guide member 62. The four grooves 621 respectively extend in the axial direction of the guide member 62. The four grooves 621 are formed at regular intervals in the circumferential direction of the guide member 62. The press-inserting member 63 has four protrusions 631 that are radially outwardly protruded from an outer circumferential periphery 63a of the press-inserting member 63. The four protrusions 631 respectively extend in the axial direction of the press-inserting member 63. The four protrusions 631 are formed at regular intervals in the circumferential direction of the press-inserting member 63 corresponding to the four grooves 621 of the guide member 62. Therefore, the four protrusions 631 of the press-inserting member 63 are respectively received in the four grooves 621 of the guide member 62, so that the guide member 62 and the press-inserting member 63 can be axially reciprocated with respect to each other while the four grooves 621 and the four protrusions 631 are respectively engaged with each other. Here, the four grooves 621 and the four protrusions 631 are respectively engaged with each other, so that the guide member 62 and the press-inserting member 63 can be restricted from rotating relatively and being inclined with respect to each other.

The guide member 62 has an inclined face 622 in the inner circumferential periphery 62a of an axially end portion 62b that is axially on the side of the magnet support 90. The inclined face 622 radially inwardly inclines, such that the inner diameter of the guide member 62 decreases from the axially end portion 62b located on the side of the magnet support 90 to a movable part 64 (FIG. 8), i.e., to the upper side in FIG. 11A in the axial direction. Specifically, the guide member 62 defines the inclined face 622 in the inner circumferential periphery 62a of the axially end portion 62b on the side of the magnet support 90 thereof, such that the inner diameter of the inclined face 622 is reduced in the axial direction from the side of the magnet support 90 to the axially opposite side as the magnet support 90 with respect to the guide member 62. Each of the protrusions 631 of the press-inserting member 63 has a rib 632 on its end portion on the axial side of the magnet support 90, such that the rib 632 axially protrudes to the magnet support 90. The rib 632 is outwardly arranged on the protrusions 631 in the radial direction of the press-inserting member 63, respectively.

Referring back to FIG. 8, the guide member 62 and the press-inserting member 63 axially moves with the movable part 64 from the upper side to the lower side in FIG. 8. The movable part 64 includes a holding member 65 that holds the guide member 62 and the press-inserting member 63. Therefore, the guide member 62 and the press-inserting member 63 can respectively axially move up and down in FIG. 8, as the movable part 64 axially moves up and down. The guide member 62 can axially move within the cylindrical space formed between the press-inserting member 63 and the holding member 65. The guide member 62 is axially urged by a resilient member such as a spring 66 toward the side of the magnet support 90. Thus, the guide member 62 and the press-inserting member 63 are moved with the movable part 64 to the side of the magnet support 90, so that the guide member 62 contacts with the magnet support 90. In this situation, axial movement of the guide member 62 is restricted. Subsequently, the movable part 64 axially moves to the side of the magnet support 90, so that the press-inserting member 63 axially moves toward the magnet support 90.

Next, operation of the motor manufacturing apparatus 60, in which the resilient members 50 are press-inserted using the motor manufacturing apparatus 60, is described.

Referring back to FIGS. 9 and 10, at first, the magnets 40 are installed in the magnet support 90. The magnets 40 are installed in the substantially cylindrical receiving space 93 formed between the outer member 91 and the inner member 92. The inner volume of the receiving space 93 is slightly larger than the magnets 40, so that the magnets 40 can be smoothly inserted into the receiving space 93. Movement of the magnets 40 are restricted by the protrusions 911 of the outer member 91 and the protrusions 921 of the inner member 92, so that the magnets 40 are uniformly circumferentially arranged in the receiving space 93 without being inclined. The magnets 40 are installed in the receiving space 93, and the inserted portions 51 of the resilient members 50 are respectively inserted into the gaps 94 (FIG. 10) that are respectively formed between the adjacent circumferentially end portions 40c of the magnets 40. Each of the gaps 94 is larger than each of the inserted portions 51, so that the inserted portion 51 of the resilient members 50 can be easily inserted into the gap 94. The inserted portion 51 of the resilient member 50 has a bent portion 53 that circumferentially protrudes from the gap 94 toward the magnet 40. Therefore, the magnet 40 contacts with the bent portion 53 of the inserted portion 51 of the resilient member 50, so that axial movement of the resilient member 50 is restricted with respect to the magnet support 90. In this situation, the resilient member 50 needs to be press-inserted into the gap 41 formed between the adjacent magnets 40 to install the inserted portion 51 into the gap 41.

Figure 12A:
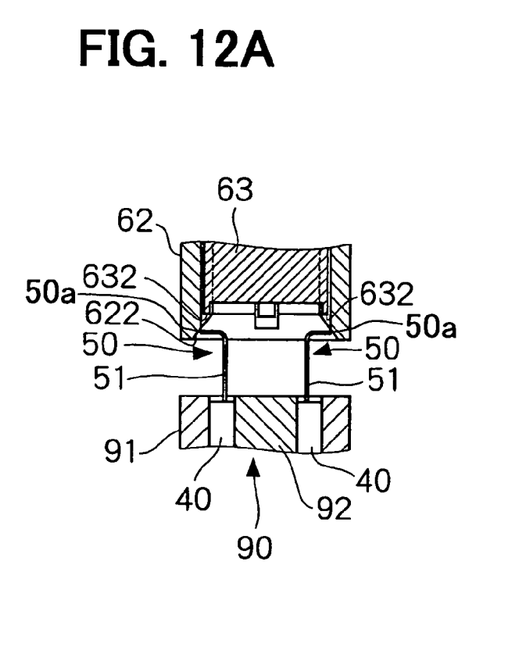
FIGS. 12A to 12D are cross-sectional views showing a press-insertion process of the resilient member using the motor manufacturing apparatus according to the first embodiment.

As shown in FIG. 12A, the magnet support 90 is located on the lower side of the guide member 62 and the press-inserting member 63, when the inserted portions 51 of the resilient members 50 are respectively partially inserted into the gaps 94. In this situation, the guide member 62 circumferentially covers upper end portions 50a of the resilient members 50, which are on the axially opposite side as the inserted portions 51, from the radially outside of the upper end portions 50a. Thus, the upper end portions 50a of the resilient members 50 contact with the inclined face 622 of the guide member 62, so that the resilient members 50 can be restricted from being outwardly inclined in the radial direction of the magnet support 90. The inclined face 622 is formed in the guide member 62, so that the upper end portions 50a of the resilient members 50 can be steadily guided by the guide member 62.

Figure 12B:
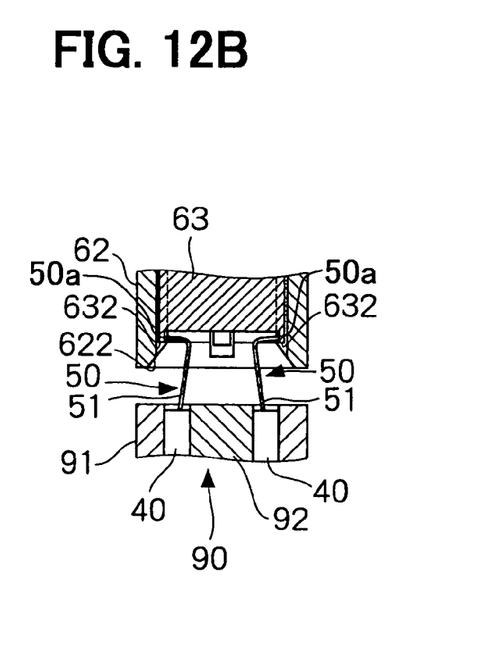

The guide member 62 and the press-inserting member 63 axially moves toward the magnet support 90, as the movable part 64 axially moves. As shown in FIG. 12B, the upper end portions 50a of the resilient members 50 can be guided radially inwardly to the press-inserting member 63 along the inclined face 622. The radially outsides of the upper end portions 50a of the resilient members 50 respectively contacts with the corresponding ribs 632 of the press-inserting member 63. Thus, the resilient members 50 can be steadily restricted from being radially outwardly inclined.

Figure 12C:
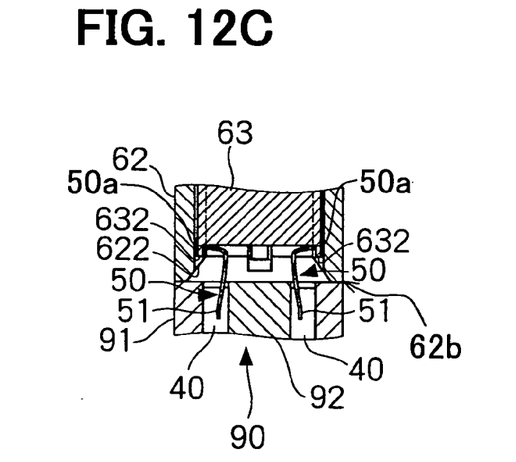

As shown in FIG. 12C, the movable part 64 (FIG. 8) axially moves further, and the guide member 62 and the press-inserting member 63 axially move with the movable part 64, so that the axially end portion 62b of the guide member 62 contacts with the magnet support 90. The press-inserting member 63 can axially move further with respect to the guide member 62. Therefore, axial movement of the press-inserting member 63 is not restricted, even axial movement of the guide member 62 is restricted when the guide member 62 contacts with the magnet support 92. Thus, the movable part 64 axially moves further, so that only the press-inserting member 63 axially moves toward the magnet support 90.

Figure 12D:
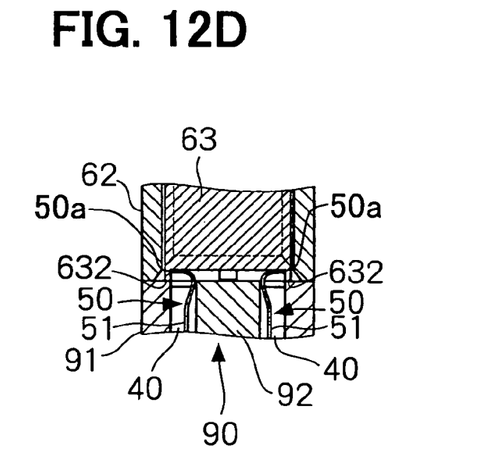

As the movable part 64 axially moves further, only the press-inserting member 63 axially moves toward the magnet support 90, so that the resilient members 50 are compressed by the press-inserting member 63 to be press-inserted into the gaps 41 formed between the adjacent magnets 40. In this situation, the upper end portions 50a of the resilient members 50 respectively contact with the ribs 632 of the press-inserting member 63. Therefore, the upper end portions 50a of the resilient members 50 are not radially outwardly inclined, and the upper end portions 50a are not radially outwardly bent due to the axial force. As a result, the resilient members 50 can be sufficiently press-inserted respectively into the gaps 41 formed between the adjacent magnets 40.

The resilient members 50 are respectively press-inserted into the gaps 41, so that the resilient members 50 and the magnets 40 are fixed to each other in the housing 11, while maintaining the cylindrical structure constructed with the magnets 40. The magnets 40 are circumferentially urged by the resilient members 50, so that the magnets 40 are radially urged onto the inner wall 11a of the housing 11.

In this structure, four magnets 40 are maintained in the housing 11 by the two resilient members 50. The resilient members 50 circumferentially urge the magnets 40 in a direction in which the magnets 40 are circumferentially spaced from each other, so that the magnets 40 are urged onto the inner wall 11a of the housing 11. Therefore, the magnets 40 are radially strongly urged onto the housing 11, so that the magnets 40 are restricted from moving in the radial direction of the housing 11, as well as the magnets 40 are restricted from moving in the circumferential direction of the housing 11. The magnets 40 are maintained in the housing 11, and are restricted from moving. Thus, the magnets 40 can be maintained in the housing 11 using a simple structure, without increasing the number of the components. Furthermore, the inserted portion 51 and the connecting portion 52 are integrally formed into the U-shaped resilient member 50. Therefore, the number of the components constructing the resilient member 50 can be reduced, and the structure of the resilient member 50 can be simplified.

The resilient member 50 is formed of resilient member, such as a metallic wire. The diameter of the resilient member 50 can be reduced as long as the resilient member 50 can generate resilient force needed for urging the magnets 40 to fix the magnets 40 in the housing 11. The diameter of the resilient member 50 is properly reduced, so that the resilient member 50 can be easily inserted into the gaps 41 formed between the adjacent magnets 40, even when the gaps 41 are small. For example, when the motor portion 30 is downsized, and the inner diameter of the housing 11 is reduced, the gaps 41 formed between the adjacent magnets 40 become small, because the circumferential lengths of the magnets 40 are preferably maintained not to reduce magnetic performance. Even in this case, when the diameter of the resilient members 50 is reduced, the inserted portions 51 of the resilient members 50 can be easily inserted into the reduced gaps 41. Thus, the magnets 40 can be strongly supported by the inserted portion 51 of the resilient member 50 inserted into the reduced gap 41. Therefore, the magnets 40 can be steadily supported in the housing 11 even when the motor portion 30 is downsized, so that the fuel pump 10 can be easily down sized.

The magnet 40 has grooves 42 in each circumferentially end portion 40c of the magnet 40. The inserted portion 51 of the resilient member 50 is received in the grooves 42. The inserted portion 51 received in the grooves 42 contacts with the magnet 40 on the inner side of the grooves 42 in the circumferential direction of the housing 11. Therefore, displacement of the inserted portion 51 in the radial direction of the housing 11 is restricted by the magnet 40 having the grooves 42, when the inserted portion 51 of the resilient member 50 is received in the gap 41 formed between the adjacent magnets 40. That is, the position of the resilient member 50 in the radial direction of the housing 11 is restricted by the grooves 42 of the magnets 40. Therefore, misalignment of the magnets 40 and the resilient member 50, which are supported in the housing 11, can be restricted.

The connecting portion 52 of the resilient member 50 does not radially inwardly protrude from the radially inner face 40b of the magnet 40. Therefore, the resilient member 50 does not interfere with the armature 31 when the armature 31 is arranged on the radially inside of the magnet 40. Thus, steady operation of the armature 31 can be maintained.

The resilient member 50 is installed between the adjacent magnets 40 using the motor manufacturing apparatus 60. The resilient member 50 is guided by the inclined face 622 of the guide member 62, so that the resilient member 50 is restricted from being radially outwardly inclined in an initial stage of a press-insertion process of the resilient member 50. The resilient member 50 is supported by the rib 632 of the press-inserting member 63, so that the resilient member 50 is restricted from being radially outwardly inclined in a middle stage and a late stage of the press-insertion process of the resilient member 50. Therefore, the resilient member 50 can be steadily inserted into the gap 41 without inclining the resilient member 50, even when axial force is applied to the resilient member 50.

Second Embodiment

Figure 13:
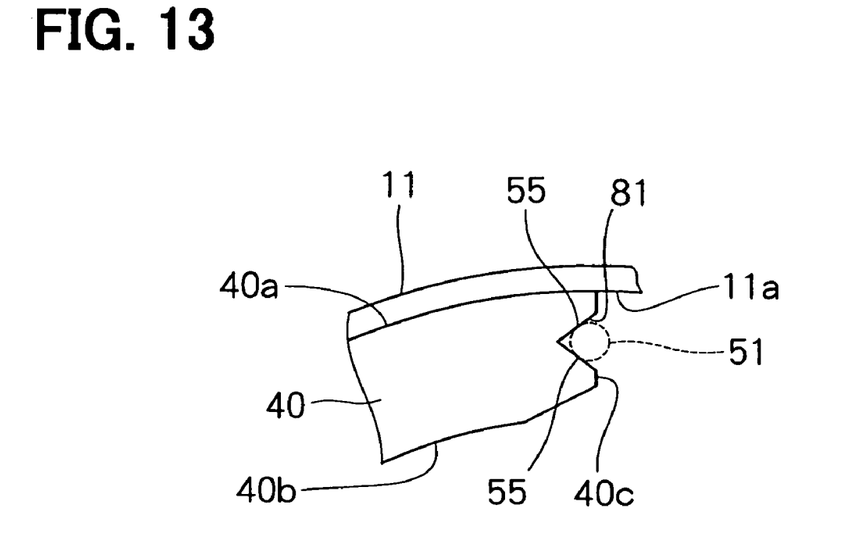
FIG. 13 is an enlarged top view showing a groove formed in the circumferentially end portion of the magnet receiving the resilient member according to a second embodiment of the present invention.

As shown in FIG. 13, the circumferentially end portions 40c of the magnet 40 respectively have grooves 81 that respectively have a substantially V-shaped cross section. In this structure, the inserted portion 51 of the resilient member 50 is at least partially received in the grooves 81. The inserted portion 51 contacts with the groove 81 at contact portions 55, which are circumferentially internally located in the magnet 40 with respect to the circumferentially end face 40e of the circumferentially end portion 40c. That is, the contact portions 55 between the inserted portion 51 and the magnet 40 are located on the side of the other circumferentially end face of the magnet 40 that is circumferentially opposite as the groove 81 with respect to the magnet 40. Therefore, even in this structure, the inserted portion 51 is properly positioned in the gap 41, so that misalignment of the resilient member 50 with respect to the magnet 40 can be restricted.

Third Embodiment

Figure 14:
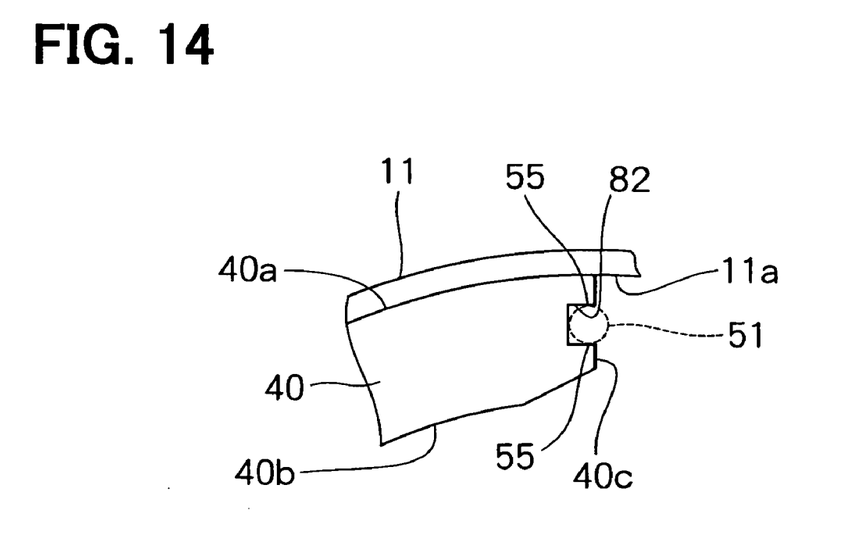
FIG. 14 is an enlarged top view showing a groove formed in the circumferentially end portion of the magnet receiving the resilient member according to a third embodiment of the present invention.

As shown in FIG. 14, the circumferentially end portions 40c of the magnet 40 respectively have grooves 82 that respectively have a substantially rectangular cross section. In this structure, the inserted portion 51 of the resilient member 50 is at least partially received in the grooves 82. Therefore, even in this structure, an effect, which is similar to the effects of the first and second embodiments, can be produced, so that misalignment of the resilient member 50 with respect to the magnet 40 can be also restricted.

The cross-sectional shape of the groove portion of the magnet 40 can be other shapes that are different from the cross-sectional shapes used in the first to the third embodiments.

Other Embodiment

The motor having the above structure is not limited to be used in a fuel pump. The motor can be used in various apparatuses, such as industrial machineries and appliances.

The motor is not limited to a four-pole motor, in which four magnets 40 are circumferentially arranged in the housing 11. The number of the magnets 40 is not limited to four, as long as the number of the magnets is at least two. One resilient member can maintain two magnets within the housing in a two-pole motor, for example.

The resilient member 50 is not limited to be formed of a metallic wire. The resilient member 50 is not limited to be formed of a metallic wire. The resilient member 50 can be formed of a leaf spring, a resilient wire, such as a thin rigid resinous wire, or the like. For example, one resilient member, e.g., a metallic wire can be inserted into two gaps, and another kind of a resilient member, e.g., a blade spring can be inserted into the other two gaps in a four-pole motor, so that the resilient members can circumferentially space four magnets from each other in the four-pole motor.

The resilient member can include more than three inserted portions. The resilient member can be constructed with multiple member. The inserted portions 51 and the connecting portion 52 are individually formed of three wire members, such as metallic wires, and the three wire members can be welded into one member, for example.

The number of the protrusions 911, 921 formed on the outer member 91 and the inner member 92 of the motor manufacturing apparatus 60, and the ribs 632 formed in the press-inserting member 63 can be modified in accordance with the structure of the motor.

One groove 42, 81, 82 can be formed in one of the circumferentially end portions 40c of each magnet 40, such that the groove 42, 81, 82 axially extends in each circumferentially end portion 40c respectively. In this case, the grooves 42, 81, 82 are arranged, such that the grooves 42, 81, 82 are not circumferentially adjacent to each other.

Various modifications and alternations may be diversely made to the above embodiments without departing from the spirit of the present invention.

What is claimed is:

1. An electric motor comprising:
a substantially cylindrical housing;
at least two magnets that are arranged along an inner wall of the housing in a circumferential direction of the housing such that the magnets, which are circumferentially adjacent to each other, define at least two gaps therebetween; and
a resilient member that is an integrated resilient wire in substantially a U-shape,
wherein the resilient member includes two inserted portions, each extending in substantially an axial direction of the housing,
one of the two inserted portions is inserted into a first one of the at least two gaps,
another one of the two inserted portions is inserted into a second one of the at least two gaps,
the resilient member includes a connecting portion extending substantially in a circumferential direction of the housing, and connecting the two inserted portions, and
each of the two inserted portions has a substantially convex bowed portion that bows in the circumferential direction of the housing to bias the magnets, which are circumferentially adjacent to each other, in a direction in which the magnets are circumferentially spaced from each other.

2. The electric motor according to claim 1, wherein the connecting portion has a shape that substantially corresponds to an axial end face of each magnet.

3. The electric motor according to claim 1, wherein the connecting portion is outwardly located in a radial direction of the housing with respect to a radially inner face of each magnet.

4. The electric motor according to claim 1, wherein each magnet defines a groove that axially extends in a circumferentially end portion of the magnet.

5. The electric motor according to claim 1, wherein each magnet defines grooves that axially extend respectively in both circumferential end portions of the magnet.

6. The electric motor according to claim 5,
wherein each groove at least partially receives the inserted portion, and
the resilient member contacts with the magnet at a contact portion in the groove that is internally located in the magnet with respect to the circumferential end face of the magnet.

7. The electric motor according to claim 1,
wherein each of the two inserted portions linearly extends substantially in the axial direction of the housing, and
the bowed portion is located in a center portion of the inserted portion with respect to the axial direction of the housing.

8. The electric motor according to claim 1, wherein the resilient member is substantially symmetric with respect to the circumferential direction of the housing.

9. The electric motor according to claim 1, wherein the bowed portion has a center portion circumferentially outwardly protruding to define the substantially convex shape thereof.

10. A magnet fitting structure received in a cylindrical housing of an electric motor, the magnet fitting structure comprising:
at least two magnets that are arranged along an inner wall of the cylindrical housing such that the magnets, which are adjacent to each other, define at least two gaps therebetween, and
a resilient member that is an integrated resilient wire substantially in a U-shape,
wherein the resilient member includes two inserted portions each extending substantially in an axial direction of the housing, one of the two inserted portions is inserted into a first one of the at least two gaps, another one of the two inserted portions is inserted into a second one of the at least two gaps, the resilient member further includes a connecting portion that extends substantially in a circumferential direction of the magnet, and connects the two inserted portions, and each of the two inserted portions has a substantially convex bowed portion that bows in the circumferential direction of the magnet to bias the magnets, which are circumferential adjacent to each other, in a direction in which the magnets are circumferentially spaced from each other.

11. The magnet fitting structure according to claim 10, wherein each of the two inserted portions linearly extends substantially in the axial direction of the housing, and the bowed portion is located in a center portion of the inserted portion with respect to the axial direction of the housing.

12. The magnet fitting structure according to claim 10, wherein the resilient member is substantially symmetric with respect to the circumferential direction of the housing.

13. The magnet fitting structure according to claim 10, wherein the bowed portion has a center portion circumferentially outwardly protruding to define the substantially convex shape thereof.

* * * * *